United States Patent
Myllymäki (10) Patent No.: US 10,347,112 B2
(45) Date of Patent: Jul. 9, 2019

(54) SUPERVISION AND CONTROL METHOD FOR PREVENTING POOR AIR QUALITY AND FIRE AS WELL AS ISSUING AN ALARM OF A DANGEROUS CONDITION

(71) Applicant: Innohome Oy, Espoo (FI)

(72) Inventor: Matti Myllymäki, Espoo (FI)

(73) Assignee: INNOHOME OY, Espoo (FI)

( * ) Notice: Subject to any disclaimer, the term of this patent is extended or adjusted under 35 U.S.C. 154(b) by 0 days.

(21) Appl. No.: 15/202,741

(22) Filed: Jul. 6, 2016

(65) Prior Publication Data

US 2017/0084156 A1     Mar. 23, 2017

(30) Foreign Application Priority Data

Sep. 21, 2015   (FI) ...................................... 20155674

(51) Int. Cl.
   *G08B 21/18*     (2006.01)
   *G08B 17/10*     (2006.01)
   (Continued)

(52) U.S. Cl.
   CPC .............. *G08B 21/182* (2013.01); *A62C 3/00* (2013.01); *G05B 19/0428* (2013.01); *G08B 17/10* (2013.01); *G08B 21/14* (2013.01)

(58) Field of Classification Search
   CPC ........ G08B 21/182; G08B 21/14; A62C 3/00; G05B 19/0425
   (Continued)

(56) References Cited

U.S. PATENT DOCUMENTS 9,182,751 B1 * 11/2015 Reeder ................. G01N 33/004
2004/0140191 A1 * 7/2004 Jerg .......................... A62C 3/16
                                                                   200/341
(Continued)

FOREIGN PATENT DOCUMENTS

CN       202084137 U      12/2011
CN       104700550 A       6/2015
(Continued)

OTHER PUBLICATIONS

Canadian Official Action dated Apr. 10, 2017 issued in counterpart Canadian patent application No. 2,933,630 (5 pages).
(Continued)

*Primary Examiner* — Omar Casillashernandez
(74) *Attorney, Agent, or Firm* — Drinker Biddle & Reath LLP (57) ABSTRACT

A supervision and control method for preventing poor air quality and fire uses an indicator unit mounted to the ceiling or on a wall and provided with an air quality sensor, and one or more control and supervision units as additional devices or as integrated or programmatic characteristics connected to home appliances or electrical devices. The air quality information measured by the air quality sensor is sent from the indicator unit to the control and supervision unit, which monitors, ventilates, and controls the operation and/or energy supply of home appliances or electrical devices on the basis of air quality information. The effect of control on air quality is monitored by the air quality sensor and an alarm is issued and/or the supply of electricity to predetermined home appliances and/or electrical devices is cut off if, regardless of control, a preset alarm limit is exceeded, when the presence of a user is not detected.

18 Claims, 5 Drawing Sheets

(51) Int. Cl.
*G08B 21/14* (2006.01)
*A62C 3/00* (2006.01)
*G05B 19/042* (2006.01)

(58) Field of Classification Search
USPC .................................................. 340/584
See application file for complete search history.

(56) References Cited

U.S. PATENT DOCUMENTS

| | | | |
|---|---|---|---|
| 2005/0035868 A1 | 2/2005 | Back et al. | |
| 2005/0110632 A1* | 5/2005 | Berezowski | G08B 17/00 340/521 |
| 2005/0224069 A1 | 10/2005 | Patil et al. | |
| 2008/0291036 A1 | 11/2008 | Richmond | |
| 2010/0218962 A1* | 9/2010 | Robb | A62C 3/10 169/46 |
| 2011/0063101 A1* | 3/2011 | Cristoforo | G08B 21/14 340/501 |
| 2013/0255546 A1* | 10/2013 | Jones | F23N 1/002 110/186 |
| 2014/0234496 A1* | 8/2014 | Siegel | A47J 27/62 426/231 |
| 2015/0077737 A1* | 3/2015 | Belinsky | G01N 21/53 356/51 |
| 2015/0096352 A1 | 4/2015 | Peterson et al. | |
| 2015/0097663 A1* | 4/2015 | Sloo | G01N 27/02 340/501 |
| 2015/0194039 A1* | 7/2015 | Martin | G08B 21/182 340/632 |
| 2015/0196161 A1 | 7/2015 | Myllymaki | |
| 2016/0247376 A1* | 8/2016 | Zhang | G08B 21/02 |

FOREIGN PATENT DOCUMENTS

| | | |
|---|---|---|
| EP | 2 897 395 A1 | 7/2015 |
| GB | 2474258 A | 4/2011 |
| WO | WO 2015/054288 A1 | 4/2015 |

OTHER PUBLICATIONS

Extended European search report dated Feb. 23, 2017 issued in corresponding European patent application No. 16174899.1 (11 pages).
Canadian Official Action dated Apr. 11, 2018 issued in counterpart Canadian patent application No. 2,933,630 (7 pages).
Canadian Official Action dated Mar. 6, 2019 issued in counterpart Canadian patent application No. 2,933,630 (6 pages).

* cited by examiner

SUPERVISION AND CONTROL METHOD FOR PREVENTING POOR AIR QUALITY AND FIRE AS WELL AS ISSUING AN ALARM OF A DANGEROUS CONDITION

RELATED APPLICATION DATA

This application claims priority under 35 U.S.C. § 119 and/or § 365 to Finish Patent Application No. 20155674 filed Sep. 21, 2015, the entire contents is incorporated herein by reference.

The invention relates to a supervision and control method of the type defined in the introduction of the accompanying claim 1 for preventing poor air quality and fire as well as issuing an alarm of a dangerous condition.

Along with new materials, household fires have become a great problem. Traditional materials burn more slowly and do not ignite as easily as present-day materials. Present-day materials and electrical devices as well as home appliances ignite more easily and in their fires is created rapidly fatal hydrogen cyanide, for which it has not been possible to develop a sensor or an alarm.

Stoves cause as much as over 50% and electrical devices as much as 80% of household fires. In student residences, the portion of stove fires is as much as 80% and also home appliances accidently left on cause significantly many unnecessary fire alarms, wherein the student residences must be emptied.

Traditional smoke and carbon monoxide indicators often act too late and, in fire situations, as many as 80% of people will already die due to fire gases before these indicators have acted. Automatic fire extinguishing systems also react too late and people die due to fire gases.

It is also known that the kitchen is the most dangerous place in the home in relation to fires, but smoke and carbon monoxide indicators are not recommended in the kitchen because they cause too many false alarms and also do not act fast enough in all situations. In student residences is also used a kitchen door alarm, which issues an alarm if the door is kept open too long. This creates a significant fire risk when the kitchen door is kept shut, wherein, in a real fire, the fire must spread so far that the smoke gets from the cracks in the closed door to the smoke indicator in the hallway.

Also a known technical solution is starting the stove hood fan as a response to stove fumes, but this solution does not prevent fire either. Ventilation devices controlled according to the amount of CO2 also do not prevent fires. Cutting off the supply of electricity in case of an alarm from a fire warning device is not as such suitable in the kitchen due to false alarms.

The indoor air quality of residences is also currently a greater problem as houses are being made tighter. Often the greatest problem is created by cooking and the fumes and moisture created therein. If ventilation is not adequate or a stove hood fan is not used, damage is caused by the fumes and moisture to structures and residents alike. In food preparation, there are also often created carbon dioxide and even carbon monoxide, which, in excessive levels, create health risks. Fumes also cause unnecessary fire alarms when there is so much fumes that they reach smoke indicators that are farther away.

The object of the invention is to improve the indoor air quality and fire safety of residences using a new method based on the monitoring of air quality and an automatic control of home appliances and electrical devices that occurs by means of the monitoring.

This object is achieved on the basis of the characterizing features presented in the accompanying claim 1. The dependent claims present preferred embodiments of the invention.

A method according to the invention includes an air quality sensor to be installed to the ceiling that appropriately controls home appliances such that cooking or other household chore is not disturbed, but, using the method, deterioration of indoor air quality is prevented if a home appliance creating fumes is accidently left on. The method can also be used to prevent fires caused by home appliances and the electricity supply.

A sensor watching indoor air quality is constructed using known indicator technologies indicating various gases and/or particles in the air. The method is novel in that, by means of the information given by the sensor, the operation of home appliances as well as the stove hood fan or exhaust fan or ventilation system is controlled such that the control occurs in stages taking into consideration the electrical devices in use.

The control is based on a controlling occurring in stages such that, when harmful gases or particles are observed in the air, in the first stage ventilation is increased. If this is not enough, an alarm can be issued by a light or audio signal, wherein the household appliance user has the chance to acknowledge the alarm or open a window. If this is not enough or the alarm is not acknowledged by the user, use of the home appliances is limited by cutting off the electricity to them. If, regardless of this, poor or dangerous air quality is still observed, an alarm can be issued.

The method is also novel in that the smoking temperature of oil can be utilized in controlling the stove such that, in connection with the time of a poor air quality notification of the air quality sensor, the temperature of the saucepan is measured, wherein it is possible to detect which oil is being used in food preparation and to adjust the alarm limit on this basis. For example, the smoking temperature of animal fat is 230 degrees but the ignition temperature 380 degrees, whereas, for rapeseed oil, the smoking temperature is approximately 260 degrees and the ignition temperature 350 degrees.

The method is also novel in that the electricity to various home appliances can be cut off from just those appliances, which are used or, in a dangerous situation, from all at once, if desired.

Using a method according to the invention, it is also possible to implement a novel smart kitchen fire warning device, which changes its sensitivity according to which home appliances in the kitchen are used and according to how the presence of a user is observed. A smart fire warning device can, for example, communicate with the stove and its safety device, which detects when the stove is on and how hot the stove temperatures are or whether a user adjusts the stove with its adjustment controls. If the user adjusts the stove, even though stove temperatures are high, the fire warning device will not issue an alarm even though it observes smoke in the air, but it will start the stove hood fan or roof exhaust fan. But if smoke is formed and there is no home appliance on in the kitchen and the light sensor of the fire warning device observes that it is night time, an alarm is issued immediately. The presence and state of a user as well as his distance can also be observed on the basis of a motion detector integrated into the fire warning device or the strength of the signal of a bracelet operating with a radio connection (bluetooth or the like) or on the basis of the activity level information transmitted by it. For detecting presence, various information can also be used, such as a bracelet, the use and adjustment of home appliances and a motion detector. If a gas-operated stove is used, a gas indicator can also be integrated into the fire warning device, wherein it can, in an alarm situation, turn off all electrical devices and the supply of gas to the stove to prevent the gas from igniting as well as start the roof exhaust fan and issue an alarm.

Into the air quality sensor can also be integrated an infrared thermometer, which is optically directed to the stove or other home appliance. Thus, a safety device can be implemented, which monitors, for example, the frying temperatures of a stove as well as the formation of smoke and is able to identify different oils and issues an alarm only in real emergencies. An IR temperature indicator can also detect the presence of a user, when his body breaks the IR measurement connection as he moves in front of the stove. A stove alarm implemented thus can also communicate with a switch connected to the electrical supply of the stove or a valve connected to a gas stove, which shuts off both electricity and gas in a dangerous situation.

To control the electricity of home appliances and intensify ventilation, it is possible to use an additional device or program to be connected to or integrated into their supply of electricity.

Using a method according to the new patent, it is thus possible to improve the quality of indoor air and react before too much humidity or poisonous gases are created or prevent a fire before it has ignited. Using the method, it is also possible to avoid unnecessary alarms, which can be a barrier to the use of a fire warning device in the kitchen or other comparable space.

A method according to the invention is described in the following examples with reference to the accompanying drawings, in which.

Figure 1:
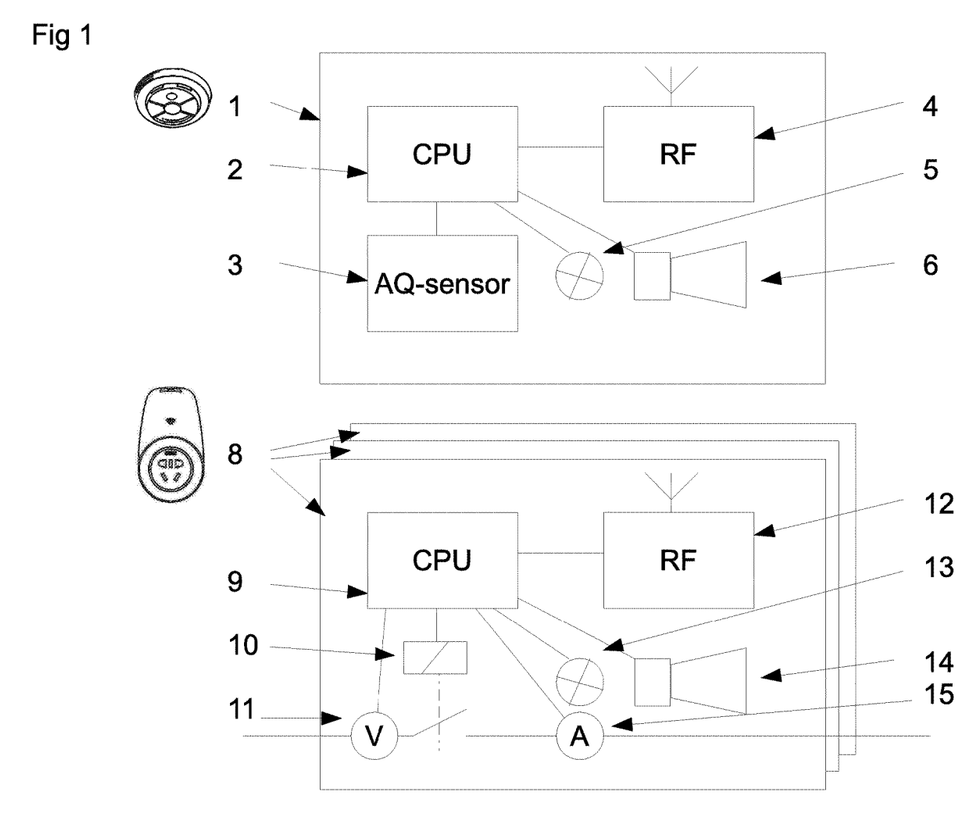
FIG. 1 shows a simplified block diagram of a smart air quality indicator 1 and the connection of the indicator 1 to the electrical supply of the home appliances with smart electrical outlets 8.

In FIG. 1, the smart air quality indicator 1 contains a microprocessor 2 and a communicator 4 implemented using known data transmission technology (BLE, Wi-Fi, etc.) as well as a required air quality sensor 3 implemented using known art. In addition to these, there are an indicator light 5 as well as an alarm 6 for local communication and issuing an alarm.

The air quality indicator 1 communicates with commercially available smart electrical outlets 8. Smart electrical outlets 8 typically have a microprocessor 9, which communicates by means of a communicator 12 implemented using known data transmission technology (BLE, Wi-Fi, etc) and measures with sensors 11, 15 the power consumption of devices connected therein and, on the basis of the information it receives, controls a device connected therein with a relay 10 to turn it on or off. Further, smart electrical outlets have a simple user interface 13, 14, by means of which they can be paired to work together with surrounding devices.

By the program of the microprocessor, the air quality indicator 1 monitors the air quality sensor 3 and when it observes a deterioration of air quality, it asks the smart electrical outlets 8 whether one of the devices connected therein is on and how much power it consumes. If some device is on at adequately high power, the air quality indicator 1 knows if the stove hood fan or roof exhaust fan is coupled to some smart electrical outlet 8 and if it is not on, it starts it. The air quality indicator 1 continues monitoring air quality and if air quality does not improve, it sends an "off" command to the smart electrical outlet reporting the largest consumption of power. If air quality still does not improve, the "off" command is also sent to the other smart electrical outlets that are on. If air quality has continued to deteriorate, a local and/or remote alarm is issued via a communication channel.

Figure 2:
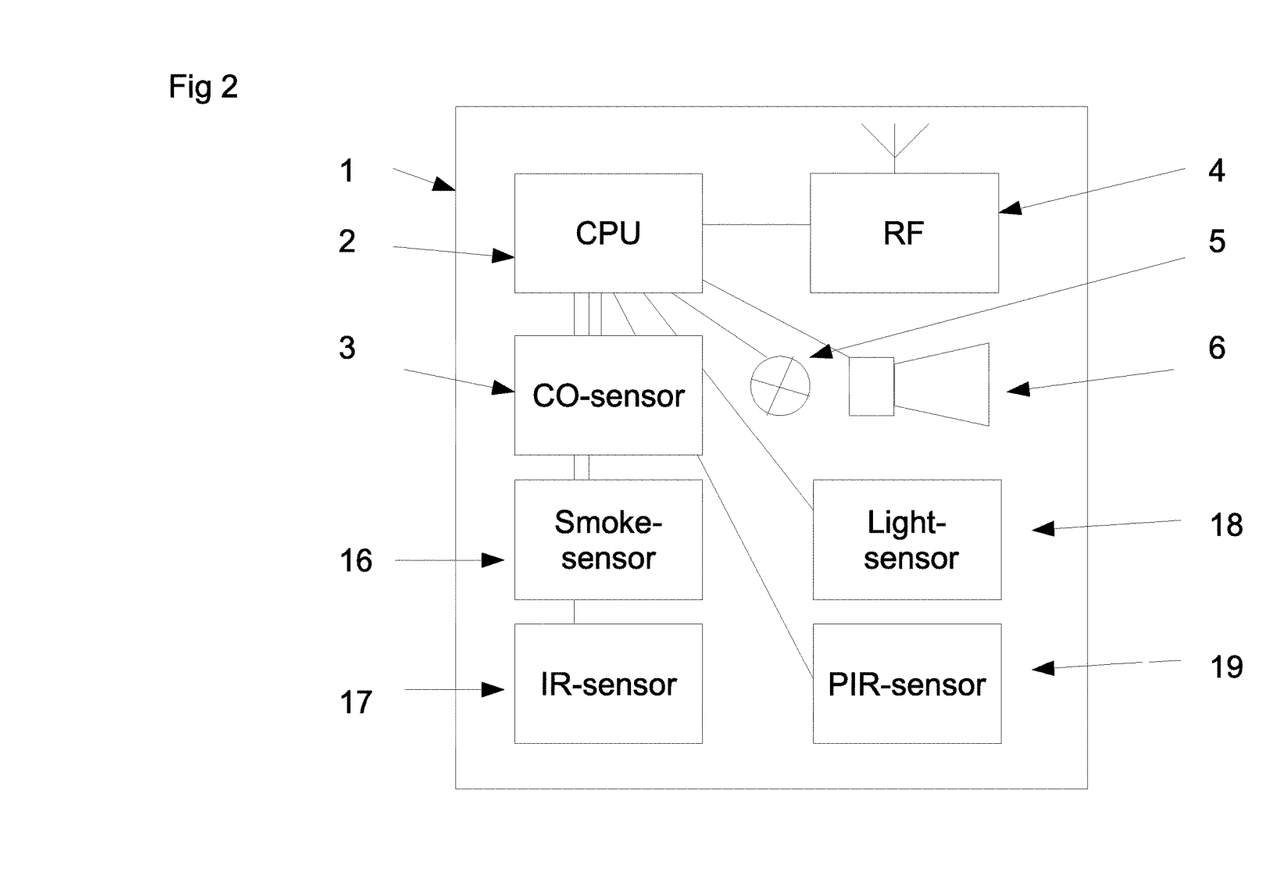
FIG. 2 shows a block diagram of a smart air quality indicator implemented with multiple sensors and with detection of the presence of a person.

FIG. 2 shows a block diagram of a smart air quality indicator implemented with multiple sensors and with detection of the presence of a person. The air quality indicator 1 described above can also contain several sensors monitoring air quality, such as a smoke indicator 16 and a CO sensor 3 as well as a light sensor 18. By means of these, a good overall picture is obtained of the prevailing situation as well as the significant risk factors. Further, the air quality indicator 1 can contain an infrared thermometer 17, which can be directed to a stove, grill or other home appliance to be supervised, by means of which dangerously high temperatures can be detected. The air quality indicator 1 can also contain a motion detector (PIR) 19, which can be used to detect whether someone is there and moving in the space to be supervised. The presence of a person can be detected in several different manners by means of an infrared thermometer 17 and a light sensor 18 as well as a motion detector 19. The infrared thermometer 17 detects if someone moves within its supervising beam between it and the nearest home appliance, wherein it can be observed that, in critical situations, someone arrives at the supervised home appliance and, by the smart electrical outlet 8, it is seen when a person turns off the device or adjusts its power to a lower setting. By the light sensor, it is seen whether it is night time and if no movement is seen by the motion detector 19 or the infrared thermometer 17 for some time, it is possible, in an abnormal situation at an earlier stage, to cut off the electricity to the home appliance and issue an alarm, if needed.

Figure 3:
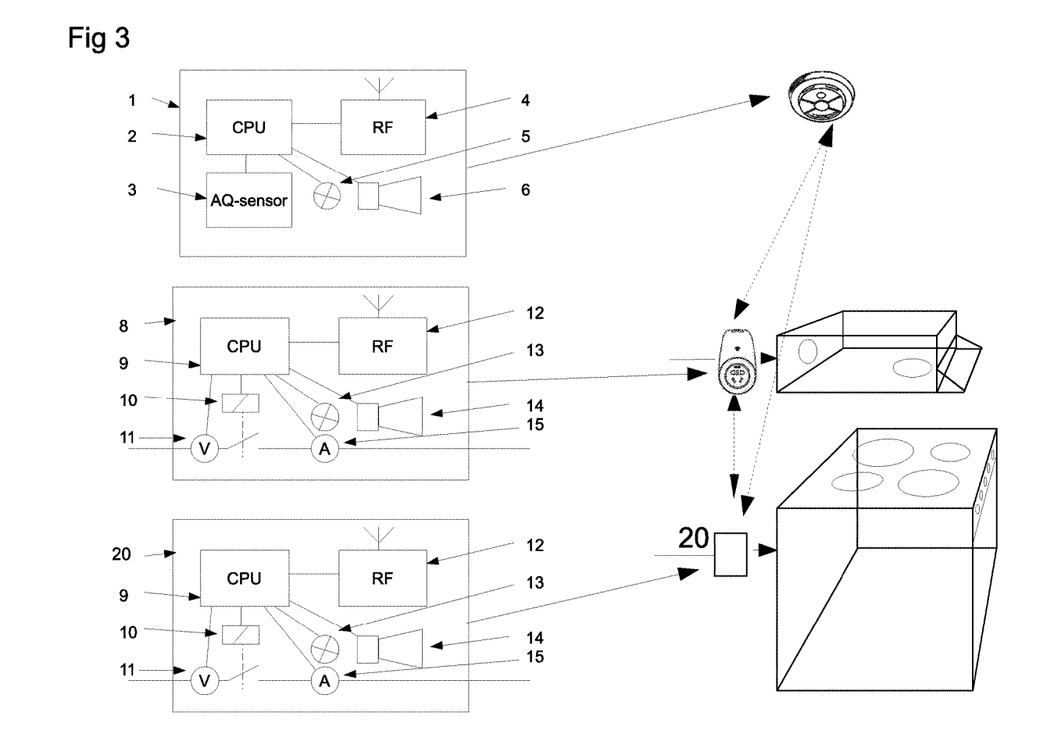
FIG. 3 shows the provision of a shared kitchen of a student residence with a known stove guard 20 to the stove and a smart electrical outlet 8 connected to the electrical supply of the stove hood fan as well as an air quality sensor 1 to be installed to the ceiling.

In the embodiment example of FIG. 3, the shared kitchen of a student residence is provided with a known stove guard 20 to the stove and a smart electrical outlet 8 connected to the electrical supply of the stove hood fan as well as an air quality sensor 1 to be installed to the ceiling. When the students prepare food normally and keep the stove hood fan on, the method does not react. If the stove is accidently left on and/or the stove hood fan is not turned on, the sensor controls the stove hood fan to turn it on and, if the fumes do not decrease, the sensor gives to the stove guard the information that there are too many particles caused by fumes in the air, wherein the stove guard can cut off the electricity to the stove earlier than usual. The sensor also initiates a preliminary alarm 5, 6 and, if the user does not acknowledge the alarm by adjusting the stove to a lower setting or is not there, the electricity of the stove is cut off.

Figure 4:
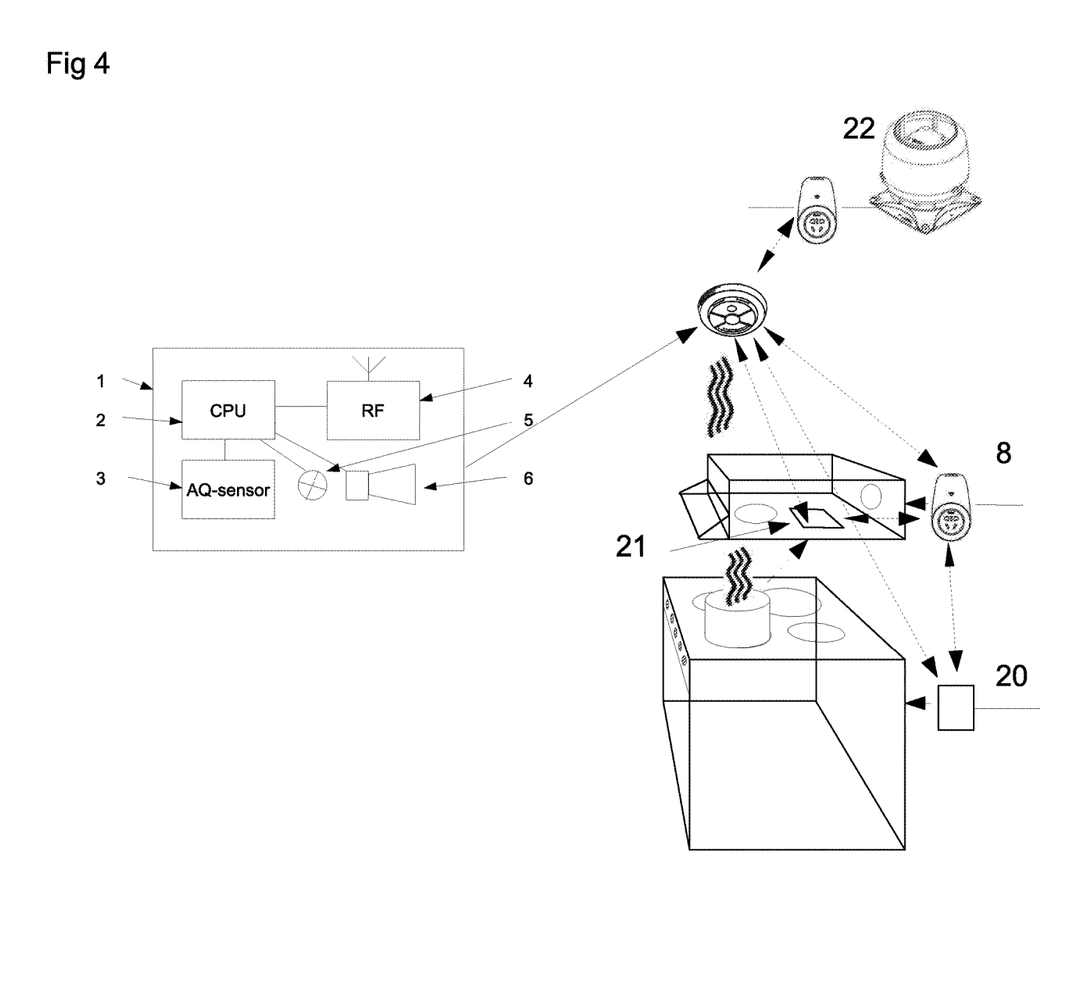
FIG. 4 shows control of the stove by the combined influence of smoke particles and heat.

FIG. 4 illustrates control of the stove by the combined influence of smoke particles and heat. In connection with deep-frying, the temperature of the oil used can easily rise above its smoke formation point, even though it does not yet cause a dangerous situation. In situations of this type, the air quality indicator 1 can report to the stove guard 20 that its temperature is above the smoke formation point, wherein, on the basis of the temperature information given by the temperature sensor 21 connected to the stove hood fan, the grease in use is detected and the operation of the stove guard 20 and stove hood fan 8 and a separate roof exhaust fan 22 can be optimized such that too many fumes do not develop in the room.

Figure 5:
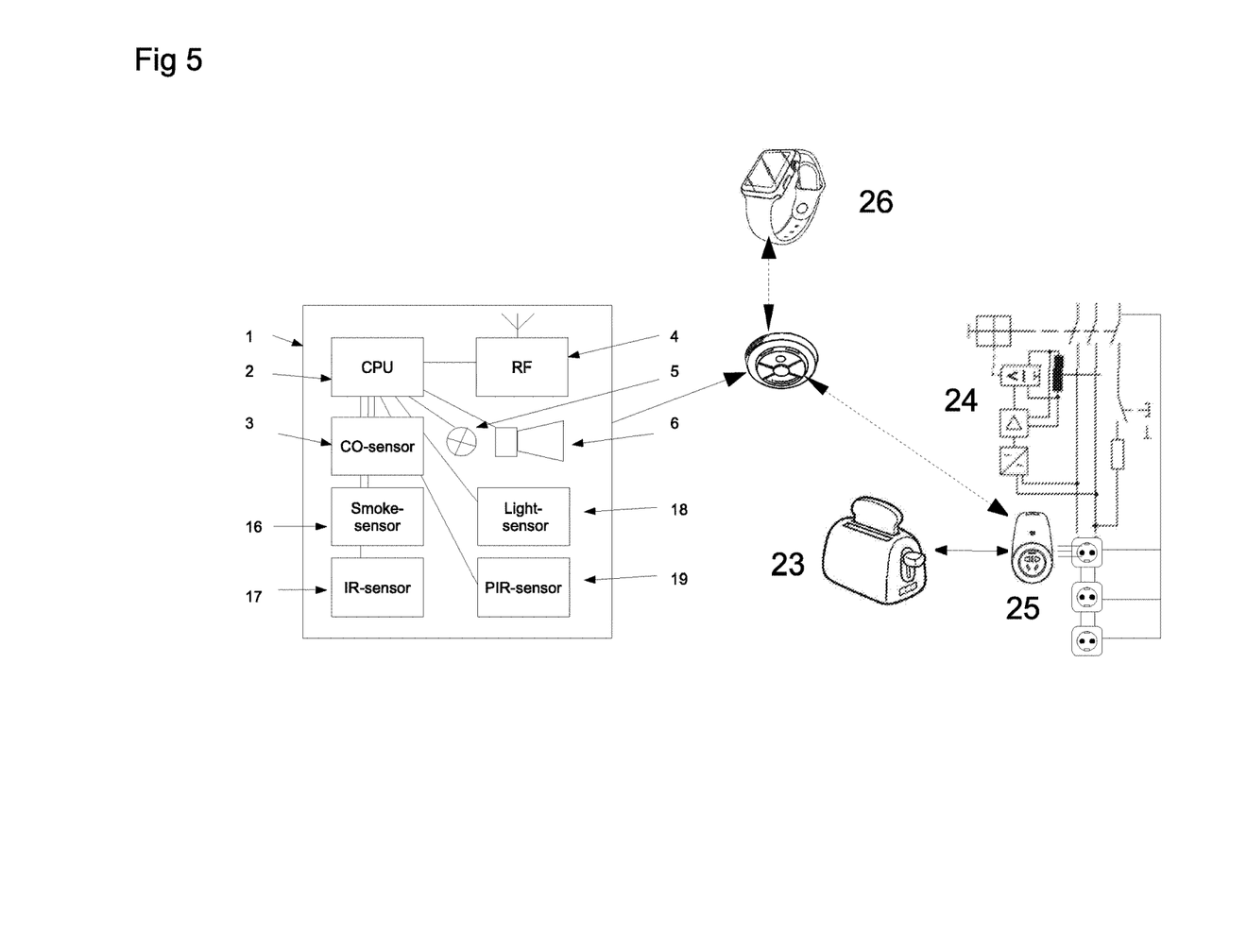
FIG. 5 shows an air quality indicator 1 provided with multiple sensors, which is arranged to control a smart electrical outlet 25 triggering the fault current protection 24 to be connected to the electricity supply of home appliances.

In the embodiment example of FIG. 5, the air quality indicator 1 provided with multiple sensors can control a smart electrical outlet 25 triggering the fault current protection 24 to be connected to the electricity supply of home appliances. Thus, for example, an infrared thermometer 17 can be directed to supervise the greatest risk factor if, for example, a toaster 23 is accidently left on and no one is detected in the kitchen by the sensors 17, 18, 19, or the air quality indicator 1 can also communicate with the smart bracelet 26, wherein, on the basis of its signal strength, it is known how far away the user is and how active he is. If the user has left the kitchen or, for example, fallen asleep, the toaster can be turned off immediately and, at the same time, all electric outlets that are connected to the same fault current protection 24 can be turned off. Thus, protection of the entire kitchen can be implemented with one smart electrical outlet 25 triggering the fault current protection. In the case of some other home appliance, its electricity can be cut off on the basis of smoke, but the use of a home appliance creating fumes can be allowed, when a person is present.

The invention claimed is:

1. A supervision and control method for preventing poor air quality and fire as well as issuing an alarm regarding a dangerous situation, the method comprising:
   using an indicator unit mounted to a ceiling or on a wall and provided with an air quality sensor and one or more integrated steerable infrared (IR) remote thermometers steerable to home appliances or electrical devices, and one or more control and supervision units, as an additional device or as an integrated or programmatic characteristic, connected to the home appliances or the electrical devices to analyze those home appliances or electrical devices to detect a home appliance or electrical device that is deteriorating air quality or creating a danger;
   sending air quality information measured by the air quality sensor from the indicator unit to at least one of the one or more control and supervision units;
   monitoring the presence of the user and controlling ventilation on the basis of air quality information;
   controlling the operation and/or energy supply of the home appliances or the electrical devices, based on the combination of temperature information and air quality information from the indicator unit; and
   intensifying ventilation and/or cutting off electricity to the electrical device or the home appliance if an alarm limit of a dangerous situation is exceeded based on the air quality information or the temperature information from the indicator unit,
   wherein the indicator unit also acts as a fire warning device, wherein a fire alarm is issued if the formation of smoke particles or other harmful gases does not decrease, even though the home appliances are turned off and a preliminary alarm is given to the user, and issuance of at least one of the alarms is delayed if the presence of a user is detected.

2. The method according to claim 1, which uses a motion detector in the indicator unit or an activity bracelet worn by a user to detect the presence of a user, wherein the presence of the user is detected by the usage information of the home appliances or the electrical devices and/or the motion detector and/or the activity bracelet.

3. The method according to claim 1, wherein control of the home appliances and the electrical devices by the indicator unit and at least one of the one or more control and supervision units together, using the detected information, is implemented in stages taking into consideration the home appliances or the electrical devices in use and that the effect of control on air quality is monitored by the air quality sensor and an alarm is issued and/or the electricity supply is cut off to predefined home appliances and/or electrical devices if, regardless of control, the deterioration of air quality continues or air quality exceeds a preset alarm limit, when the presence of a user is not detected.

4. The method according to claim 1, wherein cutting off electricity to the electrical device or the home appliance is by a controller triggering the fault current protection connected to their electricity supply, the controller measuring the on/off state or usage of the home appliances or the electrical devices together with the indicator unit and triggering the fault current protection in a dangerous situation.

5. The method according to claim 1, wherein the indicator unit and the control and supervision unit communicate bi-directionally with each other and the control and supervision unit sends to the indicator unit the usage information of the home appliances and the electrical devices.

6. The method according to claim 5, wherein the usage information includes the on/off state information of the home appliance or electrical device and information regarding the amount of power input.

7. A supervision and control method for preventing poor air quality and fire as well as issuing an alarm regarding a dangerous situation, the method comprising:
   using an indicator unit mounted to a ceiling or on a wall and provided with an air quality sensor and one or more integrated steerable infrared (IR) remote thermometers steerable to home appliances or electrical devices, and one or more control and supervision units, as an additional device or as an integrated or programmatic characteristic, connected to the home appliances or the electrical devices to analyze those home appliances or electrical devices to detect a home appliance or electrical device that is deteriorating air quality or creating a danger;
   sending air quality information measured by the air quality sensor from the indicator unit to at least one of the one or more control and supervision units;
   monitoring the presence of the user and controlling ventilation on the basis of air quality information;
   controlling the operation and/or energy supply of the home appliances or the electrical devices, based on the combination of temperature information and air quality information from the indicator unit; and
   intensifying ventilation and/or cutting off electricity to the electrical device or the home appliance if an alarm limit of a dangerous situation is exceeded based on the air quality information or the temperature information from the indicator unit,
   wherein the indicator unit is installed to an attachment base that increases its distance from the ceiling or wall or the structure of the indicator unit is such that it increases the distance of the sensors of the indicator unit from the ceiling or wall such that slight impurities of the air in small concentrations do not travel to the sensors.

8. The method according to claim 7, which uses a motion detector in the indicator unit or an activity bracelet worn by a user to detect the presence of a user, wherein the presence of the user is detected by the usage information of the home appliances or the electrical devices and/or the motion detector and/or the activity bracelet.

9. The method according to claim 7, wherein control of the home appliances and the electrical devices by the indicator unit and at least one of the one or more control and supervision units together, using the detected information, is implemented in stages taking into consideration the home appliances or the electrical devices in use and that the effect of control on air quality is monitored by the air quality sensor and an alarm is issued and/or the electricity supply is cut off to predefined home appliances and/or electrical devices if, regardless of control, the deterioration of air quality continues or air quality exceeds a preset alarm limit, when the presence of a user is not detected.

10. The method according to claim 7, wherein cutting off electricity to the electrical device or the home appliance is by a controller triggering the fault current protection connected to their electricity supply, the controller measuring the on/off state or usage of the home appliances or the electrical devices together with the indicator unit and triggering the fault current protection in a dangerous situation.

11. The method according to claim 7, wherein the indicator unit and the control and supervision unit communicate bi-directionally with each other and the control and supervision unit sends to the indicator unit the usage information of the home appliances and the electrical devices.

12. The method according to claim 11, wherein the usage information includes the on/off state information of the home appliance or electrical device and information regarding the amount of power input.

13. A supervision and control method for preventing poor air quality and fire as well as issuing an alarm regarding a dangerous situation, the method comprising:
 using an indicator unit mounted to a ceiling or on a wall and provided with an air quality sensor and one or more integrated steerable infrared (IR) remote thermometers steerable to home appliances or electrical devices, and one or more control and supervision units, as an additional device or as an integrated or programmatic characteristic, connected to the home appliances or the electrical devices to analyze those home appliances or electrical devices to detect a home appliance or electrical device that is deteriorating air quality or creating a danger;
 sending air quality information measured by the air quality sensor from the indicator unit to at least one of the one or more control and supervision units;
 monitoring the presence of the user and controlling ventilation on the basis of air quality information;
 controlling the operation and/or energy supply of the home appliances or the electrical devices, based on the combination of temperature information and air quality information from the indicator unit; and
 intensifying ventilation and/or cutting off electricity to the electrical device or the home appliance if an alarm limit of a dangerous situation is exceeded based on the air quality information or the temperature information from the indicator unit,
 wherein control of a stove utilizes information regarding smoking temperature of oil and adjusts an alarm limit on the basis of this information.

14. The method according to claim 13, which uses a motion detector in the indicator unit or an activity bracelet worn by a user to detect the presence of a user, wherein the presence of the user is detected by the usage information of the home appliances or the electrical devices and/or the motion detector and/or the activity bracelet.

15. The method according to claim 13, wherein control of the home appliances and the electrical devices by the indicator unit and at least one of the one or more control and supervision units together, using the detected information, is implemented in stages taking into consideration the home appliances or the electrical devices in use and that the effect of control on air quality is monitored by the air quality sensor and an alarm is issued and/or the electricity supply is cut off to predefined home appliances and/or electrical devices if, regardless of control, the deterioration of air quality continues or air quality exceeds a preset alarm limit, when the presence of a user is not detected.

16. The method according to claim 13, wherein cutting off electricity to the electrical device or the home appliance is by a controller triggering the fault current protection connected to their electricity supply, the controller measuring the on/off state or usage of the home appliances or the electrical devices together with the indicator unit and triggering the fault current protection in a dangerous situation.

17. The method according to claim 13, wherein the indicator unit and the control and supervision unit communicate bi-directionally with each other and the control and supervision unit sends to the indicator unit the usage information of the home appliances and the electrical devices.

18. The method according to claim 17, wherein the usage information includes the on/off state information of the home appliance or electrical device and information regarding the amount of power input.

* * * * *